US006006181A

United States Patent [19]
Buhrke et al.

[11] Patent Number: 6,006,181
[45] Date of Patent: Dec. 21, 1999

[54] METHOD AND APPARATUS FOR CONTINUOUS SPEECH RECOGNITION USING A LAYERED, SELF-ADJUSTING DECODER NETWORK

[75] Inventors: Eric Rolse Buhrke, Clarendon Hills, Ill.; Wu Chou, Berkeley Heights, N.J.

[73] Assignee: Lucent Technologies Inc., Murray Hill, N.J.

[21] Appl. No.: 08/928,372

[22] Filed: Sep. 12, 1997

[51] Int. Cl.$^6$ .............................. G10L 5/06; G10L 9/00
[52] U.S. Cl. .......................................................... 704/231
[58] Field of Search .................................. 704/238, 240, 704/242, 255, 256

[56] References Cited

U.S. PATENT DOCUMENTS

| | | | |
|---|---|---|---|
| 5,040,127 | 8/1991 | Gerson | 704/255 |
| 5,168,524 | 12/1992 | Kroeker et al. | 381/43 |
| 5,222,190 | 6/1993 | Pawate et al. | 395/2 |
| 5,251,129 | 10/1993 | Jacobs et al. | 704/9 |
| 5,329,608 | 7/1994 | Bocchieri et al. | 395/2.52 |
| 5,333,275 | 7/1994 | Wheatley et al. | 395/2.52 |
| 5,388,183 | 2/1995 | Lynch | 704/242 |
| 5,509,104 | 4/1996 | Lee et al. | 395/2.65 |
| 5,649,057 | 7/1997 | Lee et al. | 395/2.65 |
| 5,706,397 | 1/1998 | Chow | 704/242 |
| 5,719,997 | 2/1998 | Brown et al. | 704/256 |
| 5,729,656 | 3/1998 | Nahamoo et al. | 704/254 |
| 5,805,772 | 9/1998 | Chou et al. | 704/256 |

OTHER PUBLICATIONS

C–H. Lee et al., "A Frame–Synchronous Network Search Algorithm for Connected Word Recognition", *IEEE Transactions on Acoustics, Speech and Signal Processin* vol. 37, No. 11, Nov. 1989, pp. 1649–1658.

Kenny et al. A*–Admissible Heuristics for Rapid Lexical Access. IEEE Transactions on Speech and Audio Procesing, vol. 1, No. 1, Jan. 1993.

Ortmanns et al. "Look Ahead Techniques for Fast Beam Search." 1997.

Ortmanns et al. Improved Lexical Tree Search for Large Vocabulary Speech Recognition. Jun. 1998.

Van Hamme et al. An adaptive Beam Pruning Technique for Continuous Speech Recognition.

Paul et al. The lincol Large Vocabulary Stack Decoder HMM CSR. Apr. 1993.

Kenny et al. A *–Admissible heurisitics for rapid lexical access, Jul. 1991.

Kuhn et al. DP–Based WordGraph Pruning. Mar. 1996.

Aubert. Fast Look–Ahead Pruning Strategies in Continuous Speech Recognition, 1989.

Haeb–Umbach et al. Improvements in Beam Search for 10000 Word Continuous Speech Recognition. IEEE Transactions on Speech and Audio Processing, vol. 2, No. 2, Apr. 1994.

Ortmanns et al. Look Ahead Techniques for Fast Beam Search. ICASSP–97. vol. 3, 1997.

Net et al. Improvement in Beam search for 10000 Word Continuosu Speech reconigition. ICASSP–92, Sep. 1992.

*Primary Examiner*—David R. Hudspeth
*Assistant Examiner*—Robert Louis Sax
*Attorney, Agent, or Firm*—Jack R. Penrod

[57] ABSTRACT

A continuous speech decoder that is built up of multiple layers. Each of the layers uses independent knowledge sources and rules, but all the layers cooperate to quickly decode the speech input into words. A first layer is concerned with acoustic data, a second layer with phone data of speech and a third layer concerns word data and word sequences. By separating these layers, the higher layers can be made time independent and asynchronous. Thus the asynchronous layers can process data quickly and give fast support to the first layer which keeps a dynamic record called a dynamic network of the most likely continuous speech results. The speed and separation of this decoder allows better memory efficiency and better decoder results compared to previously known continuous speech decoders.

3 Claims, 2 Drawing Sheets

METHOD AND APPARATUS FOR CONTINUOUS SPEECH RECOGNITION USING A LAYERED, SELF-ADJUSTING DECODER NETWORK

TECHNICAL FIELD

The invention relates to automatic speech recognition and more particularly to a method and apparatus for continuous speech recognition using a self-adjusting decoder network having multiple layers.

DESCRIPTION OF THE PRIOR ART

Two decoder techniques are commonly known in the speech recognition field. The first of these two techniques is called the best-first based stack decoder. This first technique accommodates long span language models, multi-word grammars and increased vocabulary size. However, the best-first stack decoder method requires good search heuristics in order to estimate the least upper bound of the speech recognition path score so that search errors can be avoided and complexity reduced. The second of these two techniques is called the breadth first based beam decoder. The breadth first beam search technique does not require heuristics and the search can be made frame synchronous to the incoming speech data frames. However, the breadth first beam search decoder requires considerable circuit resources in order to support and maintain the large number of active nodes that typically are created and maintained during a beam search.

Thus, there is a need in the art for a speech recognition decoder that combines the resource advantages of the best-first stack search decoder and the accuracy advantages of the breadth first beam search decoder into a new search decoder.

SUMMARY OF THE INVENTION

Briefly stated in accordance with one aspect of the invention, the aforementioned need is achieved by providing a continuous speech recognizer that is based on three dynamically expanded networks, each having a self-adjusting capability.

In accordance with one aspect of the invention, the aforementioned need is provided by a system for recognizing speech which includes a converter for converting input speech into frames of speech data. The speech data is inputted to a dynamic programming network which receives the frames of speech data and builds nodes that represent likelihood scores of various pre-defined models corresponding to the speech data of the respective frame. An asynchronous phone expanding network operates in parallel with said dynamic programming network, and provides phone rules that control which nodes of said dynamic programming network can be connected by arcs to other nodes dependent upon said speech data. It should be noted that the word 'phone' in this application is taken directly from the Greek word 'phone', which means sound and/or speech. Additionally, an asynchronous word network operates in parallel with the phone network and the dynamic programming network to provide word rules that control which portions of the phone network correspond to recognizable words and which do not correspond to recognizable words. The dynamic programming network, the phone network and the word network cooperating to process the speech data frames to recognize the input speech.

In accordance with another aspect of the invention, the aforementioned need is achieved by providing a speech recognition system including: a converter for converting input speech into frames of speech data; a dynamic programming process that establishes a plurality of nodes in response to the frames of speech data and arc paths connecting to others of the plurality of nodes thereby forming a speech decoder network; a phone rule driven process that applies pre-determined phone rules for the speech decoder network to establish a phone network and increase the accuracy of an output of the speech recognition system; and a word rule driven process that applies pre-determined word rules for the speech decoder network and the phone network to increase also the accuracy of the output of the speech recognition system.

In accordance with another aspect of the invention, the aforementioned need is achieved by providing a decoder for continuous speech recognition using a processor and a memory having a plurality of memory locations. The decoder has a speech framer for regularly processing input speech into consecutive frames of acoustic data. Connected to the output of the speech framer are a word network process for storing and applying language rules, a phone network process for storing and applying phone rules; and a dynamic programming network process. The dynamic programming network process processes the acoustic data to build a network of nodes connected by arcs which provide possible decodings of the input speech. The dynamic programming network process also uses information from the word network process and the phone network process to direct the building of the nodes and the connection of each node to previous nodes by arcs.

DETAILED DESCRIPTION

Figure 1:
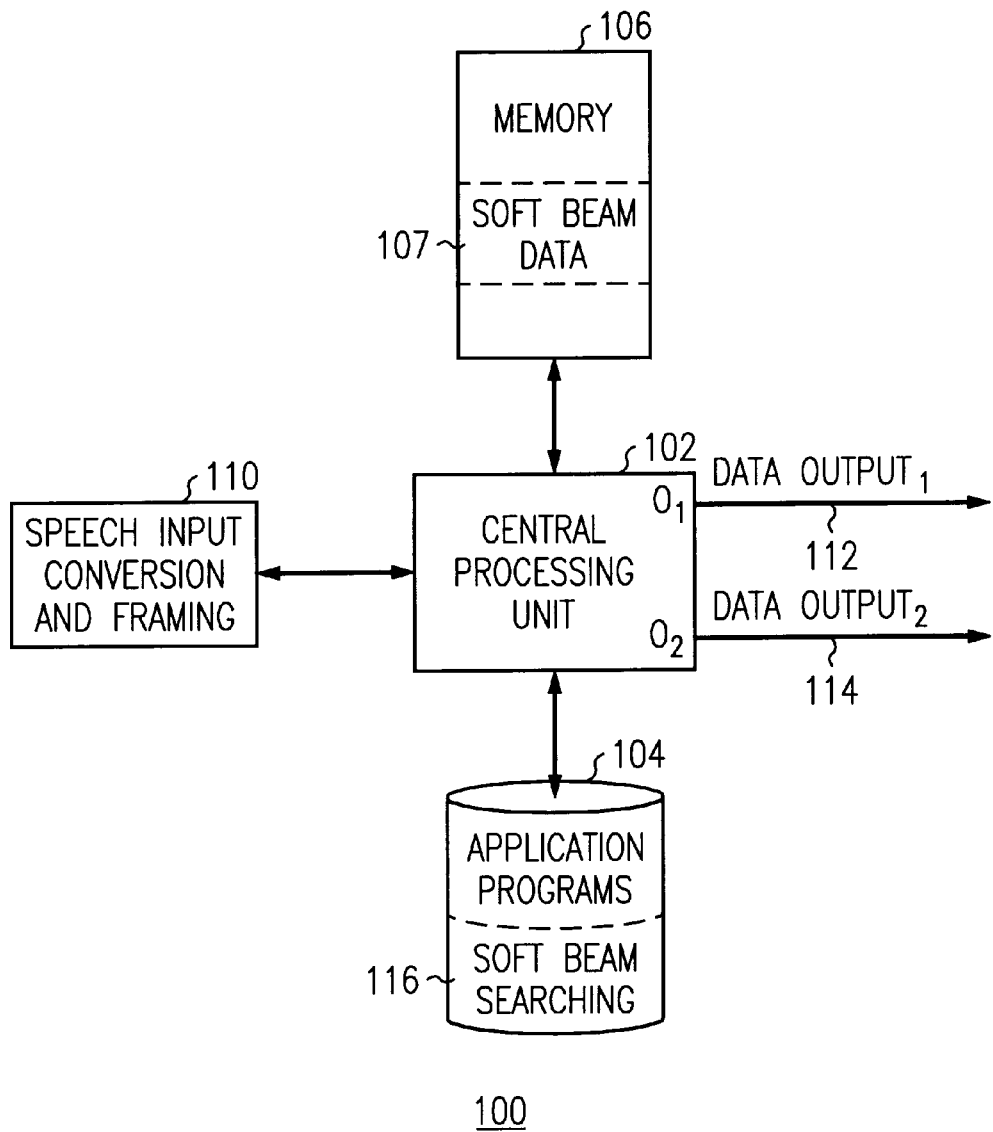
FIG. 1 is a block diagram of a system according to one aspect of the present invention.

Referring now to FIG. 1, a system 100 is shown. System 100 has a processor unit 102 that has sufficient processing capability and equivalent throughput to decode one or more channels of continuous input speech, for example a PowerPC 604 by Motorola Corporation, Schaumburg, Ill. Processor unit 102 is connected to a storage unit 104 which stores the operating system and application programs that support the method and apparatus of the present invention. Processor unit 102 is also connected to memory 106 which is a high speed memory such as a random access memory. Memory 106 stores the intermediate results of continuous speech decoding.

System 100 has a speech input framing unit 110. Speech input framing unit 110 receives speech that has been converted into electrical signals for transmission and converts these signals into frames of data for speech recognition. Such framing of speech data is discussed in: *A Frame Synchronous Network Search Algorithm for Connected Word Recognition*, written by Chin-Hui Lee and Lawrence R. Rabiner and published in IEEE Transactions on Acoustic and Signal Processing, volume 37, No. 11, November 1989, which is hereby incorporated by reference. After speech input framing unit 110 has converted the speech data into frames, processor unit 102 by the support of the programs from storage unit 104 and the data in memory 106 performs a continuous speech decoding according to the present invention.

Figure 2:
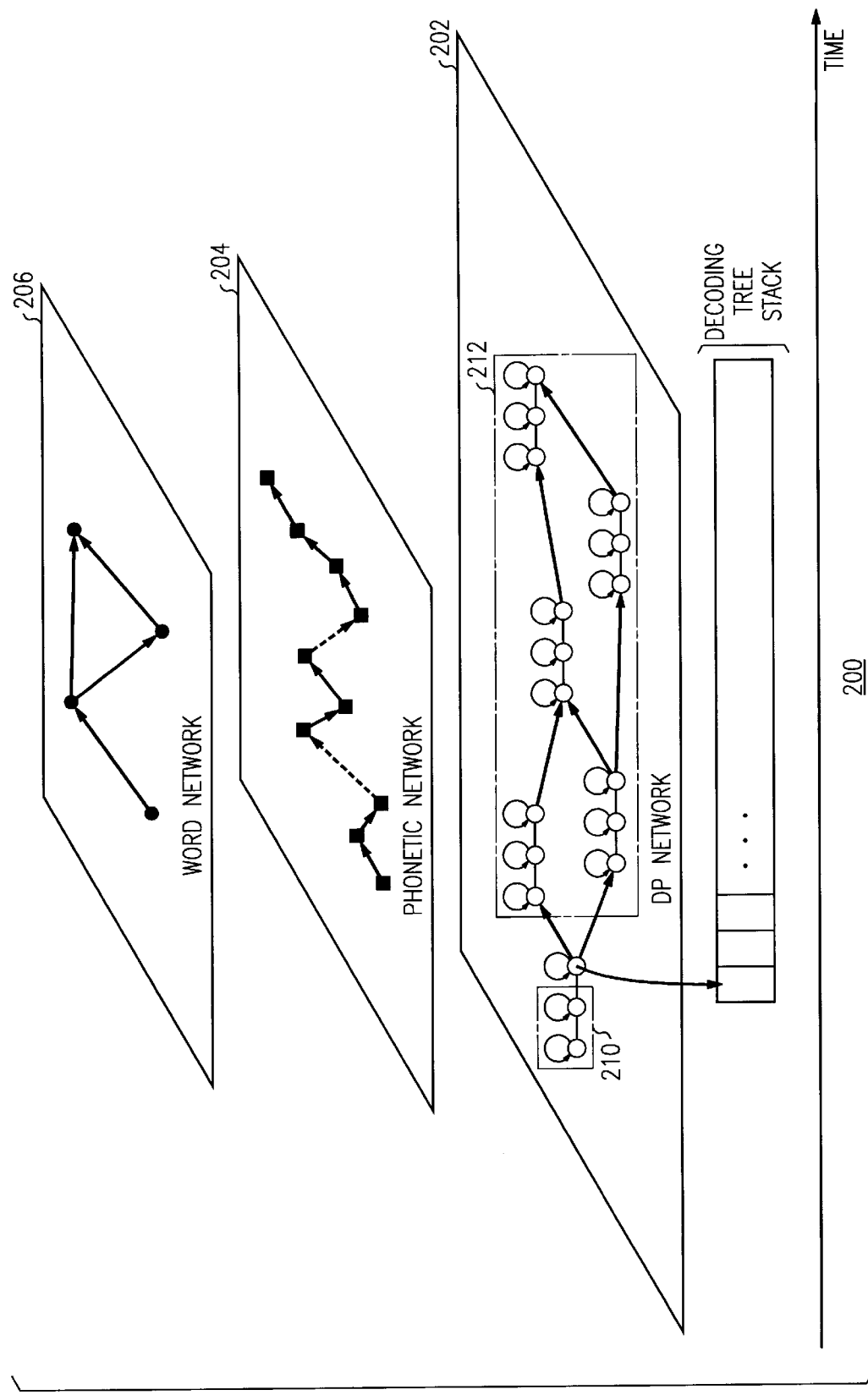
FIG. 2 illustrates a layered decoding network architecture according to the present invention.

Referring now to FIG. 2, a method for continuous speech decoding referred to as a wave decoder 200 is illustrated.

Wave decoder 200 has three individual layers to provide the continuous speech decoding function. One layer, a dynamic programming layer (DP), is a dynamically constructed layer which serves as an anchor point layer to support fast network expansion and reconstruction, should the need occur. The wave decoder 200 is a decoding network that is sliced horizontally into three layers: a dynamic programming network layer 202, a phone network layer 204 and a word network layer 206. The dynamic programming network layer 202 is based on the integration of all knowledge sources and is the place where the dynamic programming is performed. Phone network layer 204 keeps the phone level knowledge sources, such as a phone lexicon graph. The word network layer 206 keeps the word level knowledge source such as grammar constraints and specifications from the language model.

This speech decoder architecture of multiple layers, each providing a separate decoding function, is a sharp departure from previous continuous speech decoders. In wave decoder 200, the use of cross-word, tri-phone models and other detailed acoustic modeling techniques in the speech recognition search will only affect the size and the complexity of the dynamic programming network layer 202, without affecting the phone network layer 204 and the word network layer 206. The word network layer 206 and phone network layer 204 are independent from the type of acoustic model used at the dynamic programming network layer 202. Since any penalty on the phonem transitions can be mapped down to the dynamic programming network layer 202, the phone network layer 204 is then implemented as independent of both the acoustic model and the language model. The phone network layer 204 is time independent, and is a layer which can be easily copied and/or shared. The word network layer 206 is also time independent and is a layer that can be easily copied and/or shared.

The horizontal layering of the decoding network according to the present invention has the advantage that more than 90% memory usage is at the lower dynamic programming network layer 202. The upper layers 204 and 206 form a very light layered structure which supports very fast dynamic programming network expansion and reduction. In the wave decoder 200, the speech decoding network, which includes all three layers 202, 204 and 206, is both constructed dynamically and released frame synchronously. Dynamically growing the layered structure is accomplished very quickly because the horizontal slicing of the decoding network in wave decoder 200 not only makes the layers of the structure light but also isolates the knowledge sources making it easier to grow a decoding network of nodes, scores and arcs to related upper level nodes. The difficult issue is the dynamic expanding and reduction, i.e. releasing, of the dynamic programming network layer, especially for the case where the decoding network is re-entrant.

The wave decoder 200 is a special case of a general speech decoding network. The wave decoder 200, especially the dynamic programming network layer, is a self-adjusting graph of likelihood nodes and arcs. At any time instant, the stored data (and hence the memory space resources), are self-adjusted to serve the need of that particular time frame. If FIG. 2 is viewed from the time axis, this time frame corresponds to a vertical slice of the decoding network, Net_active(t), as illustrated by the unenclosed area of dynamic programming network layer 202 in FIG. 2. Net_active(t) is the active portion of the decoding network at that particular time instant t that the self-adjusting dynamic search graph represents. Net_active(t) is an approximation of the minimum and sufficient local decoding network to cover the need of active nodes at the present time frame, t. Net_active(t) is determined mainly by the model matching at that particular time frame and is relatively independent of the depth of the grammar and the duration of the speech input. For the wave decoder 200, and primarily dynamic programming network 202, $$\max(\text{size}(\text{Net\_wave})) \approx \max(\text{size}(\text{Net\_active}(t))) \leq \text{Net-static}.$$

This size relationship holds even for re-entrant networks because the need for re-entrant to non re-entrant network transformations can be eliminated for the wave decoder 200. The significance of which will be explained below.

The actual decoding (search) process is ultimately performed at the dynamic programming network layer 202. Active path is represented as a node in the corresponding decoding (search) tree of the search graph. Such node representation for search graphs is known from "Principles of Artificial Intelligence" by N. J. Nelson published by McGraw Hill in 1980.

The dynamic programming network layer 202 forms the search graph in the present invention and each active path is represented as a node in the corresponding decoding (search) tree of that search graph. Each node in the decoding tree carries with itself all necessary links, scores and traceback information. Similar decoding graph structures have been used in static decoders for many years. However, in a dynamic decoder, the search graph is not physically built but the subset of the search graph covering the need of the decoding tree at the current time instant must be well established in order to make the search admissible to the list of viable possibilities. This dynamic network is self-adjusting and varies with time.

For a non re-entrant network, the expansion is performed forward and locally the network is not punctured by dynamic network releasing. On the other hand, for a re-entrant decoding network, such as wave decoder 200, it often occurs that a previously used portion of network which is partially or totally released from the previous actions is re-entered. When a re-entrance to a previously used portion of the network which is partially or totally released from the previous actions occurs, one known problem of previous decoders is the so called "wanton expansion". The "wanton expansion" occurs if the network dynamic programming cannot locate the remaining pieces of the previously used network and thus generates duplicate network structures. The result of "wanton expansion" is the decoding memory usage overflow and the tremendous waste of CPU cycles (i.e. processing time).

In order to overcome the problems of "wanton expansion" and wasted CPU cycles, a two-level dynamic hashing structure is used in the wave decoder. At each phone network node, a hashing process hashes the related nodes existing in the dynamic programming network and stores the results in a respective phone network node table. The hashing process also hashes the related arcs, i.e. hidden Markov model instances, existing in the dynamic programming network and stores the results in a respective phone network arc table. Beam search is performed for all nodes presently in the decoding tree. A network pruning procedure is then followed to release nodes and arcs which are not active. A network expansion procedure, on the other hand, grows any needed arcs or nodes based on hashing information and adjusts the shape of the dynamic search graph. The result of this controlled pruning and growing is a minimum and sufficient decoding graph that covers the needs of supporting the remaining active nodes for the next time instant.

There are three structures in the wave decoder that are managed dynamically for the dynamic programming network. These are dynamic programming arcs, dynamic programming nodes and hashing tables. The dynamic programming arcs are released once they are not within an active part of the search beam. The dynamic programming nodes are released if they no longer terminate an active dynamic programming arc. The dynamic hashing tables, which are used to hold the record of the existing portion of arcs and nodes under the higher layers, are released when they become empty because of their arcs being not within the search beam and their dynamic programming nodes do not terminate an active dynamic programming arc.

When re-entering a used decoding network, the dynamic network generation engine first examines the node hash table at the upper level phone node to re-establish the missing nodes and reuse the existing nodes which have been left from the previous time instant. Then it examines the arc hashing table at the respective phone node to re-establish the missing arc connections and reuse the existing arcs. The use of fast dynamic hashing is important because a linear search can incur quite a cost in recovering a punctured network.

With the layered, self-adjusting decoding graph, one pass dynamic decoding is made possible on a punctured decoding network, and therefore it no longer requires the network to be non-re-entrant. Moreover, the key issue of controlling network growth in one pass dynamic decoding can be addressed in accordance with the present invention. Unlike the conventional beam search decoders, the one-pass dynamic decoder is a quasi-stack decoder. Active word end nodes are sorted and linked into various dominance chains. These chains in fact form a stack, and each dominance chain is an entry in the stack. Only the most likely word-end on the chain is allowed to create successor nodes and each expanding word end node has its own copy of its successor network. This can lead to a tremendous growth in a decoding network if not controlled properly. The layered, self-adjusting decoding graph provides the enhanced control on the network growth, while at the same time supporting a much deeper network pruning clue to its layered architecture.

In operation, efficiency of the wave decoder 200 is an important issue. Closely related to efficiency of the wave decoder 200 is the mortality rate of newly created arcs and nodes in the dynamic programming network. In general, this newly created arc mortality rate issue can be more easily handled using fast-match and other heuristics in the network pruning procedure, although the admissibility of the search may suffer. In wave decoder, an admissible arc predication scheme is incorporated if no other heuristics for arc prediction are available. This scheme is based on a novel modification of the traditional beam search and herein after referred to as a soft beam search. In the traditional beam search, the best path score at the current time frame is first identified. Once the best path score is identified, other paths, whose scores are more than a distance $\Delta$ below the best path, are pruned. However, computing the best path score in a dynamic decoder is not a trivial matter. If a node is active, all scores of paths entering the first state of the following arcs are often missing. Thus, a rebuilding of such arcs is required first. On the other hand, it is often the case that many of such newly built arcs are found to be outside of the beam right after the best path score is determined, and hence pruned away by the pruning procedure. Such rebuilding and pruning cam cause memory thrashing and slow down the decoding speed.

For the wave decoder 200, a soft beam based on existing arcs is calculated first. Arc predication is performed before any new arc is created. The arc predication engine first calculates the path score entering the first state of each respective arc before physically allocating each missing arc. This calculated path score is compared with the present soft beam. If a calculated path score is within the soft beam, the predicted arc is created and the soft beam is updated. This soft beam scheme is admissible assuming that the selected width of the correct beam is appropriate, because the soft beam scheme permits a lower cut-off score than the cut-off score determined by the correct beam. This admissible arc predication scheme is useful for the dynamic decoder, but it makes almost no difference for a static decoder, because in that scenario, the decoding network is always fully built. For a dynamic decoder, this admissible arc predication scheme is quite effective in reducing the mortality rate of the newly created arcs, one of the critical problems which plagues the efficiency of previous dynamic decoders.

The use of detailed acoustic models in speech recognition makes it important to minimize the redundancy in the decoding network. In theory, for context dependent tri-phone modeling, there are N×M connections for each center phone in the dynamic programming net, where N is the number of different left phone context and M is the number of different right phone context. However, depending on the context dependent tri-phone model unit inventory in the acoustic model, many tri-phone model units are cloned using the available tri-phone model units which most closely resemble the missing tri-phone model units. As a consequence, the number of distinct arc connections is often much less than N×M. Optimizing a fully compiled static dynamic programing network is relatively straightforward, whereas reducing the redundancy in a dynamically constructed dynamic programming network is more involved. The situation becomes more acute when the network is not only constructed dynamically but is also being punctured due to various partial releases. In this situation, the local network is not fully built, and the redundancies, if they exist, are difficult to locate. In the wave decoder 200, the dynamic network expansion process employs certain optimization procedures in creating the dynamic programming network.

In order to reduce arcs in dynamic network building, a model inventory hashing table for distinct tri-phone models in the existing arcs is maintained at the corresponding phone network node. For each node requiring an arc expansion, the following method is performed to minimize the dynamically generated decoding network. If there is an existing arc based on the arc hashing table with the same tri-phone model unit from that node, no new arc is created and the arc is shared with a new destination node added for that arc. Further, if there is no existing arc with the desired tri-phone model unit, a new arc is created and inserted in the arc hashing table. These procedures are all performed at the local N×M dynamic programming network level, and therefore, such arc sharing is possible. In fact, the minimized self-adjusting local search graph is a generalized graph because one arc can have multiple starting nodes and multiple ending nodes as a result of incorporating the structure of an acoustic model in the search graph minimization.

In operation, one embodiment of the present invention has been implemented and tested. In one application, the test task was recognition of known length connected digit strings. When fully expanded, the decoder grammar for 16 digit strings had a depth of 16 levels. The acoustic model used in the experiments was a set of 274 context dependent acoustic model units. The inter-word context dependency was explicitly modeled and each digit model was represented as a context dependent graph with 12 fan-in heads, one body and 12 fan-out tails. The speed overhead of maintaining a self-adjusting search graph in the wave decoder 200 was negligible (<2%) and the peak decoding memory usage was only 6% of the corresponding static decoder. It is clear that additional savings could be achievable for multi-channel automatic speech recognition by sharing the higher layers, i.e. the phone network layer and word network layer, across different channels. The peak memory usage was determined mainly by the number of channels active and their joint memory usage at each time instant. Because the peak memory usage for each channel is sparsely distributed over the duration of the speech input and happens at a different time instant, the actual memory usage for a multi-channel decoder can be even much less. The wave decoder 200 was also tested for a most compact re-entrant grammar, a no-grammar network with a re-entrant null arc transition, using the same set of acoustic model. The total peak decoding memory usage was only 80 KB (0.08 MB). In both cases, there is an order of magnitude memory usage reduction compared to a static decoder. In fact, for a dynamic decoder, it is relatively easy to get significant savings on a huge decoding network, whereas savings on a very compact grammar is often more difficult, depending on the tightness of the self-adjusting search graph at each time instant.

Thus, it will now be understood that there has been disclosed a new method and apparatus for providing continuous speech recognition. While the invention has been particularly illustrated and described with reference to preferred embodiments thereof, it will be understood by those skilled in the art that various changes in form, details, and applications may be made therein. For example, the wave decoder can be a semi-autonomous circuit module within a larger system. Multiple wave decoders can also share the same word layer and the same phone layer to conserve resources, regardless of implementation within the system. It is accordingly intended that the appended claims shall cover all such changes in form, details and applications which do not depart from the true spirit and scope of the invention.

What is claimed is:

1. A method for continuous speech recognition, comprising the steps of:

calculating a soft beam based on existing arcs;

predicting a new arc before any new arc is created;

said predicting step includes calculating by means of an arc predication process a path score entering the first state of each respective arc before allocating memory space for each new arc;

comparing each calculated path score with a present soft beam;

if a calculated path score is within the present soft beam, creating the predicted arc; and updating the soft beam.

2. The method of claim 1, wherein the updated soft beam cut-off score is lower than the cut-off score determined by the standard beam used in beam searching.

3. The method of claim 1, wherein searching with the updated soft beam causes a mortality rate of newly created arcs to be reduced and an efficiency of a dynamic decoder using the updated soft beam for searching to be improved over a dynamic decoder using standard beam searching.

* * * * *